United States Patent [19]

Yamada et al.

[11] Patent Number: 5,204,849
[45] Date of Patent: Apr. 20, 1993

[54] DISK PLAYBACK APPARATUS WITH CENTERING DEVICE FOR DIFFERENT DISK SIZES

[75] Inventors: Yoshinori Yamada; Kazuo Kobayashi; Masanori Sugihara; Susumu Yoshida; Kiyoshi Morikawa; Masakazu Kurumada, all of Kawagoe, Japan

[73] Assignee: Pioneer Electronic Corporation, Tokyo, Japan

[21] Appl. No.: 491,906

[22] Filed: Mar. 12, 1990

[30] Foreign Application Priority Data

Aug. 11, 1989 [JP] Japan .................. 1-208712

[51] Int. Cl.⁵ .............. G11B 33/02; G11B 17/04
[52] U.S. Cl. .................. 369/75.2; 369/77.1; 360/99.06
[58] Field of Search .......... 369/75.2, 77.1, 77.2, 369/270, 191, 194; 360/99.02, 99.03, 99.06, 99.07; 235/484; 209/601, 602, 603, 900, 655

[56] References Cited

U.S. PATENT DOCUMENTS

| | | | |
|---|---|---|---|
| 4,497,051 | 1/1985 | Takahashi et al. | 369/77.1 |
| 4,498,162 | 2/1985 | Schatteman | 369/194 X |
| 4,764,917 | 8/1988 | Sugihara et al. | 369/75.1 X |
| 4,839,880 | 6/1989 | d'Alayer de Costenore | 369/75.2 |
| 4,969,140 | 11/1990 | Koiwa et al. | 369/75.2 X |
| 5,022,023 | 6/1991 | Toyoguchi et al. | 369/75.2 |
| 5,031,169 | 7/1991 | Kato et al. | 369/77.1 |
| 5,036,509 | 7/1991 | Kobayashi et al. | 369/77.1 |
| 5,056,077 | 10/1991 | Morikawa et al. | 369/75.2 |

FOREIGN PATENT DOCUMENTS 2120831 12/1983 United Kingdom .

Primary Examiner—Eugene R. LaRoche
Assistant Examiner—Michael G. Kessell
Attorney, Agent, or Firm—Sughrue, Mion, Zinn, Macpeak & Seas

[57] ABSTRACT

A disk playback apparatus with a centering mechanism for positioning a small or a large disk which comprises a support frame, a clamper arm swingably mounted on a rear portion of the support frame, and a centering mechanism for guiding large and a small diameter disks from a front side of the playback apparatus to a position between the support frame and the clamper arm when the disk is inserted into the playback apparatus. The centering mechanism has a pair of centering arms for contacting with a circumferential edge of the disk for positioning the disk in place, a centering lever provided in the clamper arm and connected to the pair of centering arms for simultaneously opening/closing the pair of centering arms, and lock arms each rotatably mounted on the associated centering arm for locking the centering arm independently, the lock arms allowing the pair of centering arms to be swingable when both the lock arms are released. This playback apparatus can center both the small and large size disks at a clamp position.

8 Claims, 8 Drawing Sheets

DISK PLAYBACK APPARATUS WITH CENTERING DEVICE FOR DIFFERENT DISK SIZES

BACKGROUND OF THE INVENTION

1. Field of the Invention

The present invention relates to a disk playback apparatus provided with a centering mechanism for accurately and consistently positioning a disk, which has been inserted therein, at a clamp location on a turntable.

2. Description of the Related Art

Recently, there has been provided a compact disk referred to as a disk hereinafter in which analog sound are converted into digital signals and then pits corresponding to the digital signals are formed in a recording layer thereof. With such a disk, analog sound may be optically reproduced by a laser beam emitted from an optical head of the CD player. Also, in comparison with a conventional LP record, the disk is extremely superior in sound quality and operational properties. Accordingly, the disk has been widely used together with the CD player. In particular, CD players have been developed for automotive use. When a disk having a diameter of 12 cm for playback of music is inserted into a disk insertion opening, the disk is loaded toward a predetermined position (the substantially central position of the CD player) by a loading mechanism. When the disk is brought into contact with a stop portion provided within the CD player, the loading operation is stopped to position the disk in place. In this position, the disk is fixed onto a turntable by means of a clamper arm. The disk on the turntable is rotated by a spindle motor, and the music recorded in the disk is reproduced by a read-out head.

On the other hand, a disk having a much smaller diameter of 8 cm has been recently developed. However, if it is desired to insert such a disk into the insertion opening of the conventional CD player, the operator must pay special attention to the operation because the width of the insertion opening is too large.

Also, in a conventional CD player, since the stop portion for stopping the inserted disk at the clamp position is provided for positioning the large diameter disk, when the smaller disk is transferred into contact with the stop portion, the smaller disk would be advanced beyond the clamp position.

Accordingly, there has been proposed a centering system for guiding the small diameter disk to the center of the disk insertion opening. In this case, a disk guide plate has been provided below the clamper arm for guiding the small disk to the clamp position.

However, if such a centering mechanism is provided at the disk insertion opening, the overall mechanism of the player becomes complicated. Also, in a conventional disk player, after the centering operation of the disk has been performed at the disk insertion opening, the disk is transferred to the clamp position. As a result, there is a possibility that the disk would be likely to be displaced or offset during clamping so that it would be difficult to accurately clamp the disk at the desired position. Furthermore, when a larger disk is inserted into the player, the disk must be brought into contact with the centering mechanism, and the operator must push the disk to open the centering mechanism. This can be cumbersome to the operator.

SUMMARY OF THE INVENTION

In view of the foregoing difficulties, an object of the present invention is to provide a disk playback apparatus having a centering mechanism that may more accurately center an inserted small or large diameter disk at a clamp position.

According to the present invention, there is provided a disk playback apparatus having: a support frame, a clamper arm swingably mounted on a rear portion of the support frame, and a centering mechanism for guiding a large and small diameter disks from a front side of the playback apparatus to a position between the support frame and the clamper arm when the disk is inserted into the playback apparatus. The centering mechanism includes: a pair of centering arms swingably provided on the clamper arm on a side of the support frame and having contact portions for contacting with a circumferential edge of the disk for positioning the disk in place. A centering lever is provided on the clamper arm and connected to the centering arms for simultaneously opening/closing the pair of centering arms. Lock arms are rotatably mounted on the associated centering arm for locking the centering arm independently, the lock arms allow the pair of centering arms to be swingable when only when both the lock arms are released.

When a small disk is inserted into the playback apparatus, if the disk is displaced from the center, one of the lock arms is angularly moved to release the locking condition. However, in this case, the other lock arm is not released but is kept under the locking condition. Accordingly, the other centering arm is not swung. The disk centered in contact with the latter centering arm is guided to a regular clamp position.

On the other hand, if large diameter disk is inserted into the playback apparatus, both lock arms are angularly moved to release the locking condition by circumferential edge of the disk. In this case, both the lock arms are released to release the lock mechanism. While the circumferential edge of the disk is being brought into contact with the contact portions of the centering arms, the centering arms are equally opened to thereby perform the centering and guide operation simultaneously.

BRIEF DESCRIPTION OF THE DRAWINGS

In the accompanying drawings:

FIG. 11 is a perspective view showing the guide member.

DESCRIPTION OF THE PREFERRED EMBODIMENTS

One embodiment of the invention will now be described with reference to the accompanying drawings.

Figure 1:
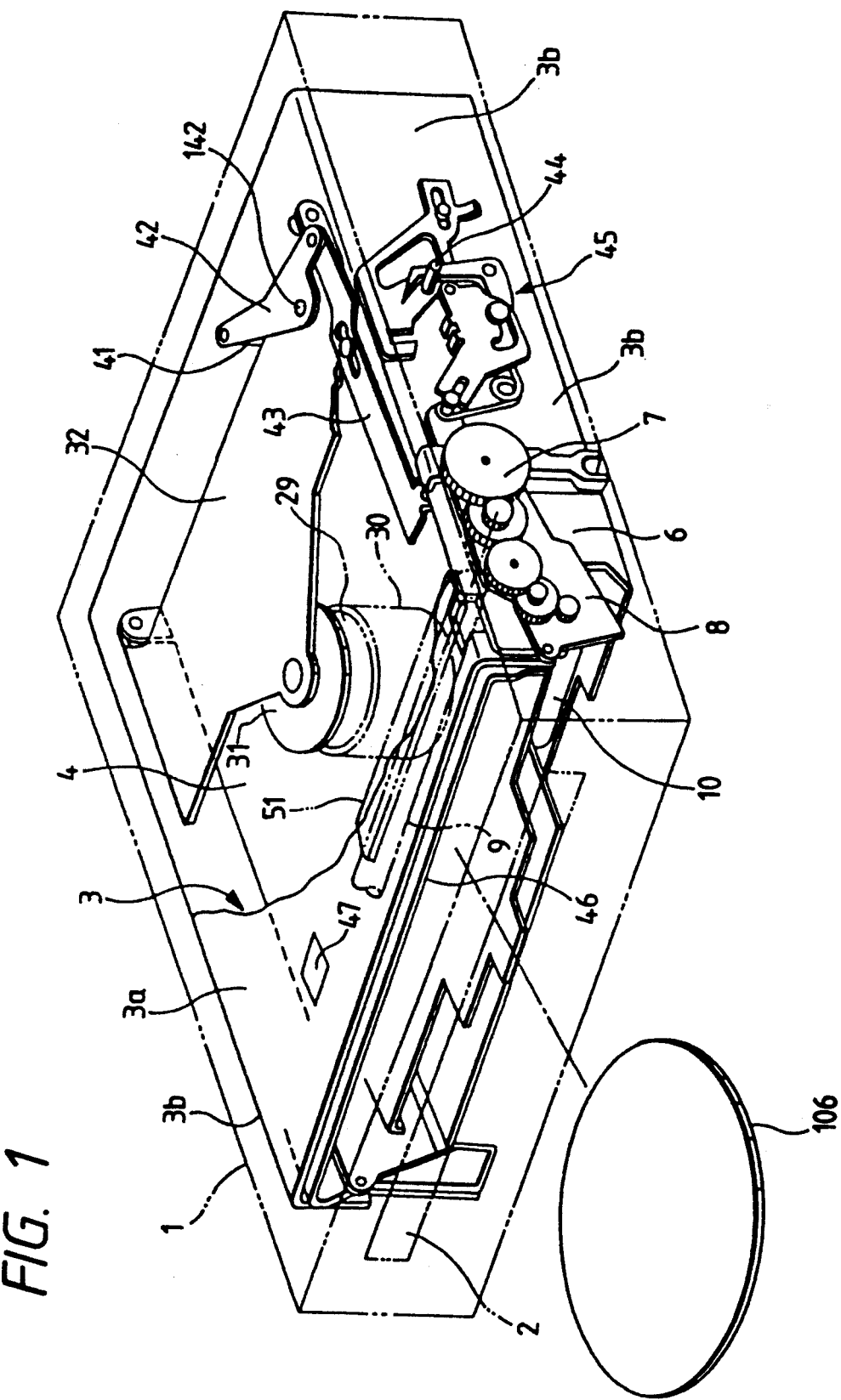
FIG. 1 is a perspective view showing a disk playback apparatus according to the invention.
Figure 2:
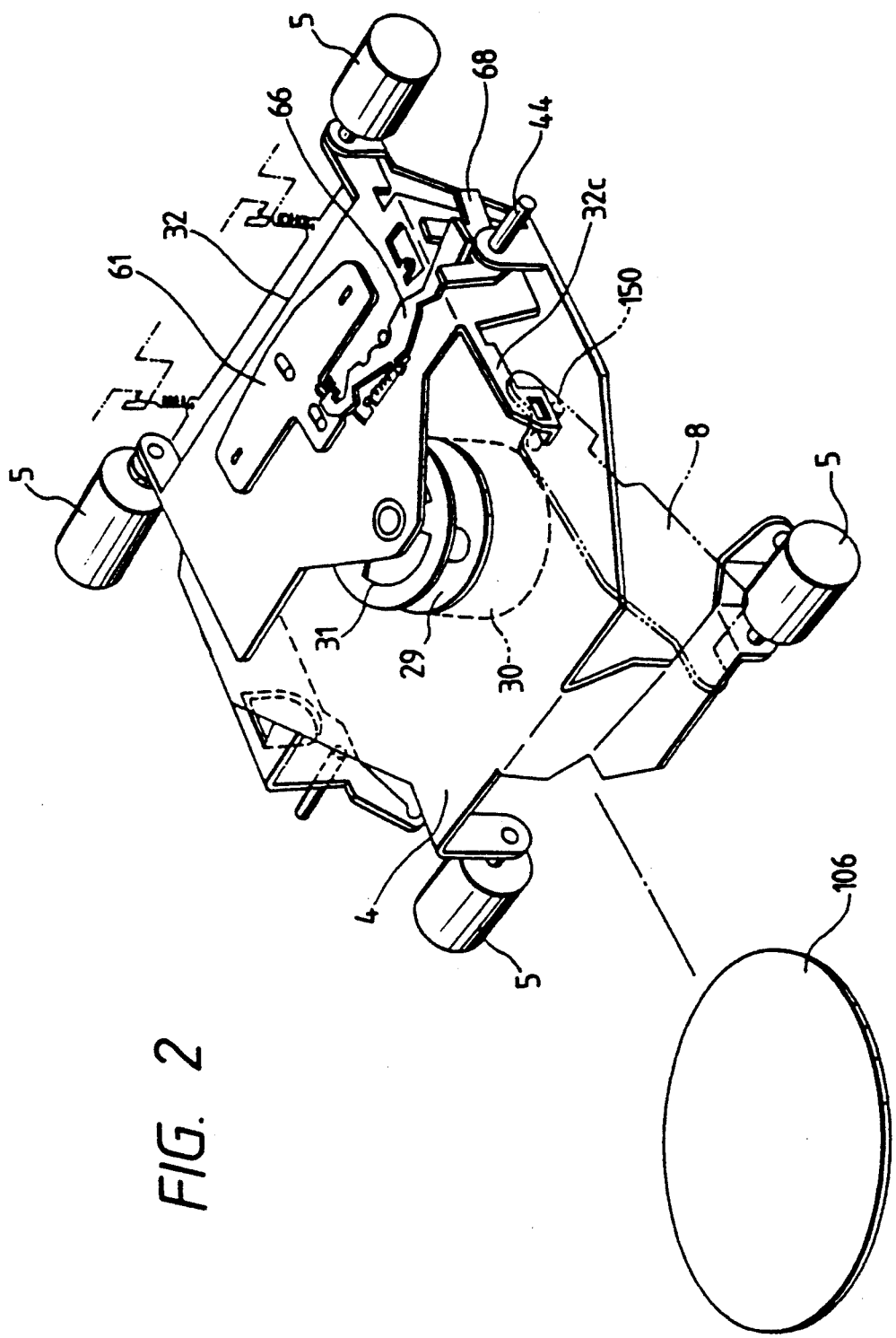
FIG. 2 is a perspective view showing a support frame shown in FIG. 1.

FIGS. 1 though 12 show a CD player according to the embodiment of the invention. In FIG. 1, a disk insertion opening 2 is formed in a front face of a casing 1 of the CD player to which the present invention is applied. A frame 3 is received in the casing 1. This frame 3 has a substantially planar ceiling plate 3a and side plates 3b, 3b each of which is bent downwardly from the ceiling plate 3a. Inside the frame 3, a support frame 4 is arranged as shown in FIG. 2. A playback device (not shown) for reproducing a piece of music recorded in a disk is disposed substantially at the center of the support frame 4. The support frame 4 is floatingly supported on the frame 3 through dampers 5. A loading mechanism 6 for transferring a disk 106 or 101 having a large or small diameter of 12 cm or 8 cm respectively to a predetermined position (i.e., center of the support frame 4) and a loading arm swing mechanism 7 for swinging a loading arm 8 are provided on a front side portion of the frame 3. The loading mechanism 6 has a drive roller 9 mounted on the support frame 4.

Figure 11:
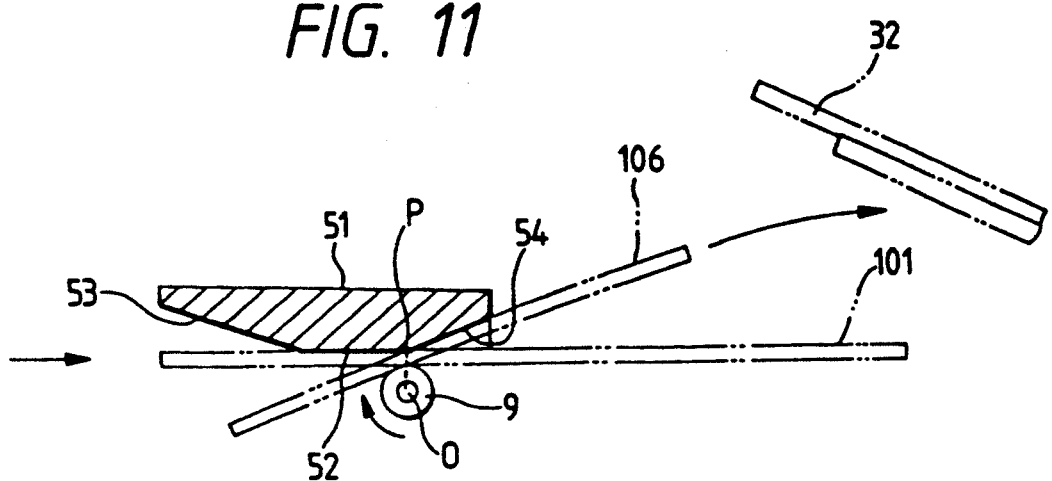
FIG. 11 is a cross-sectional view showing the guide member.
Figure 12:
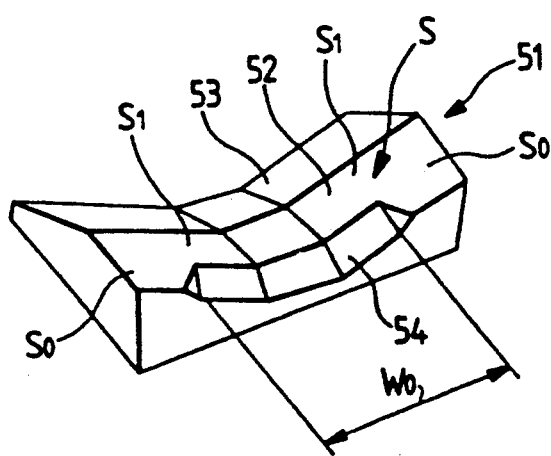

As shown in FIGS. 11 and 12, above the drive roller 9, there is provided a disk guide means such as a guide member 51 for guiding the disk 101 or 106. The guide member 51 has a guide recess S. The opposite end portions $S_0$ and $S_0$ of the guide recess S are brought into contact with a circumferential portion of the large disk 101 and serve to transfer the latter. Surfaces $S_1$ and $S_1$ inside the end portions $S_0$ and $S_0$ are brought into contact with a circumferential portion of the small disk 106 and serve to transfer the latter. Also, the quide member 51 is made of synthetic resin or the like. As best shown in FIG. 12, a horizontal guide surface 52 extending in the same direction of the opening direction of the disk insertion opening 2 in a curved manner and kept substantially in parallel to the transfer direction of the disk is formed in the lower surface of the guide member 51 (the horizontal guide surface extends horizontally in section as shown in FIG. 11). A gently slanted surface 53 is extended adjacent the horizontal guide surface 52 in the rear portion thereof and a short slanted groove 54 in the front portion thereof.

The slanted surface 53 serves to introduce a front end portion of the disk 101 or 106, inserted into the disk insertion opening 2, between the guide member 51 and the drive roller 9. The horizontal guide surface 52 serves to guide the disk 101 or 106, positioned between the guide member 51 and the drive roller 9, in the disk insertion direction in parallel. The slanted groove 54 serves to guide the disk 106 having a diameter of 8 cm toward a disk guide plate which will be described later. A width $W_0$ of the slanted groove 54 is set so that the small disk 106 is inserted into the slanted groove 54 immediately before the small disk 106 reaches the clamp position but the large diameter disk 101 is not inserted into the slanted groove 54.

The axis of the drive roller 9 is located somewhat in front of a point immediately below a transit point P between the horizontal guide surface 52 and the slanted groove 54 with respect to the disk transfer direction as shown in FIG. 11. The disk 106 inserted into the disk insertion opening 2 is guided in parallel to the disk insertion direction along the horizontal guide surface 52, and thereafter is guided into the slanted groove 54. As a result, the forward end of the disk 106 is raised and the disk 106 is guided toward the disk guide plate to be described later. The large diameter disk 101 is not guided into the slanted guide groove 54 even if the large disk 101 is guided by the guide recess 52 but the large diameter disk 101 is transferred horizontally along the horizontal guide surface 52.

On the other hand, the loading mechanism 6, the loading arm swing mechanism 7 and a lock mechanism 45 to be described later are described in Japanese Utility Model application No. 62-136632 assigned to the present assignee. Also, the loading motor 10 is provided in the front side of the frame 3. When the drive roller 9 is rotated by the drive of the loading motor 10, the disk 106 inserted into the disk insertion opening 2 is transferred to a predetermined position.

As shown in FIG. 1, a photo sensor 47 is provided in the vicinity of the disk insertion opening 2 substantially at the center of the ceiling plate 3a of the frame 3. It is possible to detect, by the photo sensor 47, whether or not the disk 106 is inserted into the disk insertion opening 2. When the photo sensor 47 detects the insertion of the disk 106, a signal from the photo sensor 47 is outputted to a control circuit (not shown), so that the loading motor 10 is driven by the control circuit. When the loading motor 10 is driven, the disk 106 is transferred by the cooperation between the drive roller 9 and the guide member 51.

A turntable 29 on which the disk 106 is to be loaded is provided in the middle of the support frame 4 as shown in FIG. 2. The turntable 29 is drivingly rotated by a spindle motor 30 provided on a lower side of the support frame 4. A small disk-like clamper 31 is located above the turntable 29. The clamper 31 is provided at a triangular projecting end of a clamper arm 32 which is swingably mounted on a rear portion of the support frame 4. A tension spring (not shown) is laid between the clamper arm 32 and the support frame 4 so that the clamper arm 32 is urged toward the turntable 29.

Figure 3:
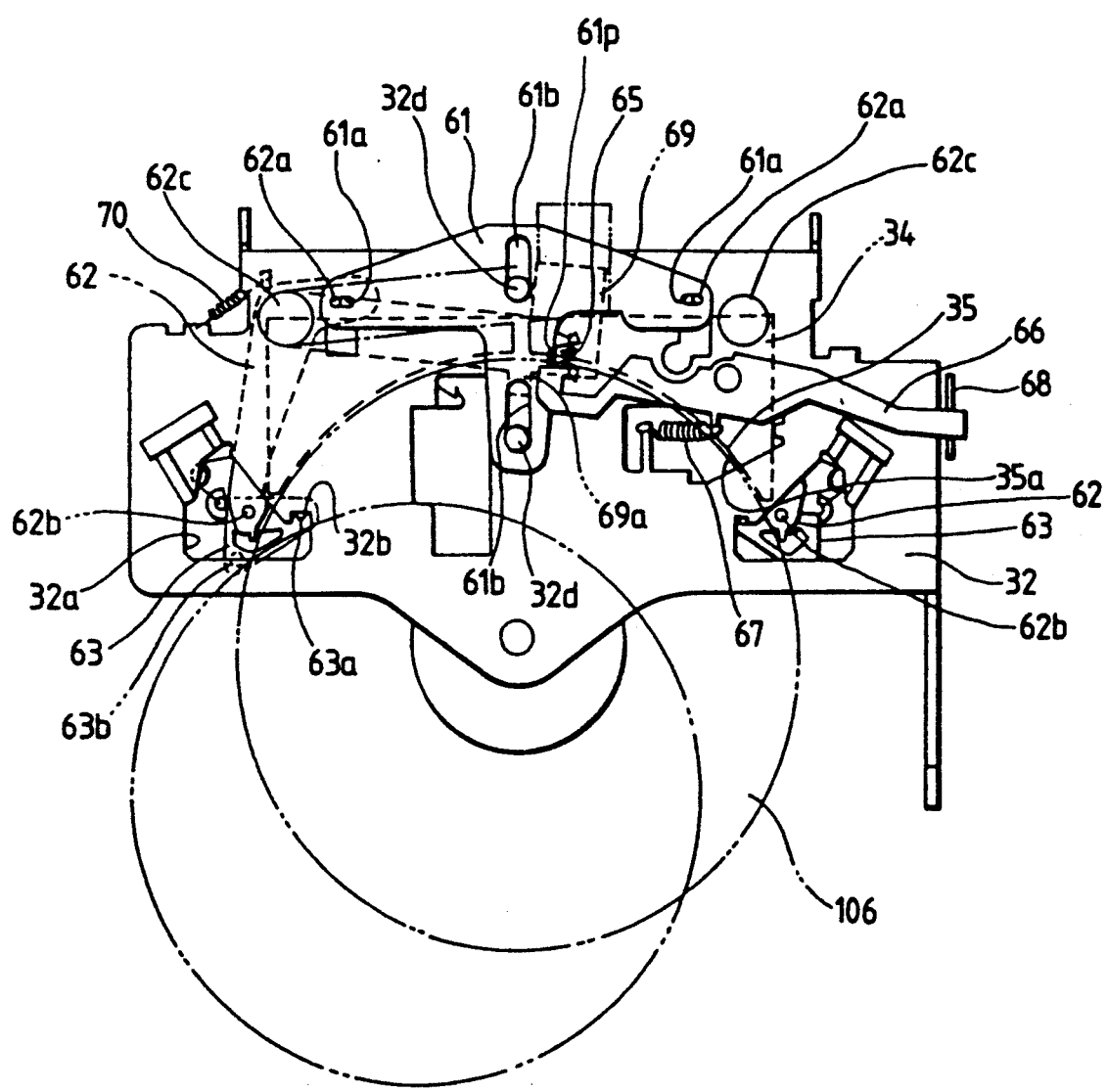
FIG. 3 is a top plan view showing a clamper arm when a small disk is inserted into the apparatus.
Figure 4:
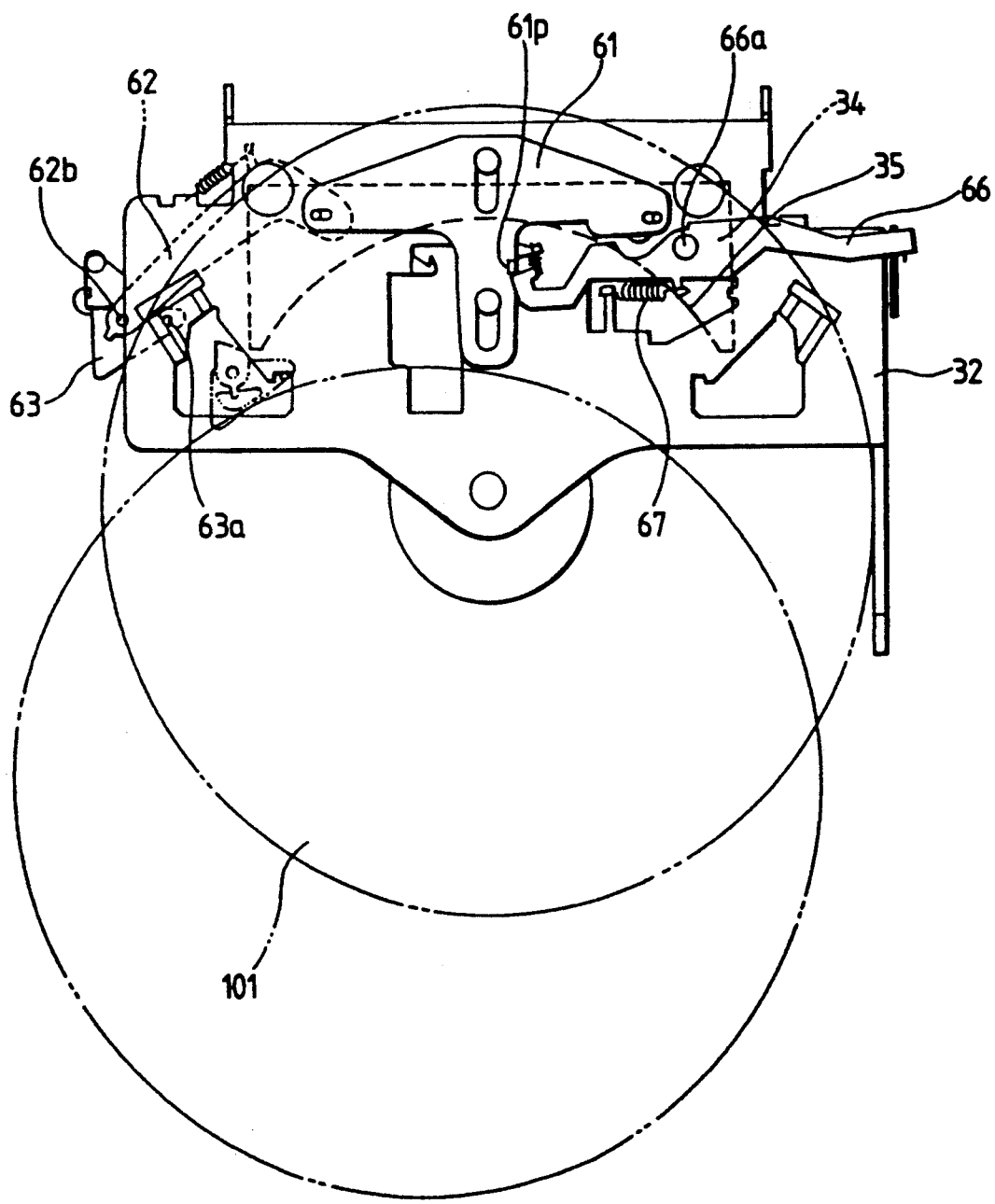
FIG. 4 is a top plan view showing the clamper arm when a large disk is inserted into the apparatus.
Figure 5:
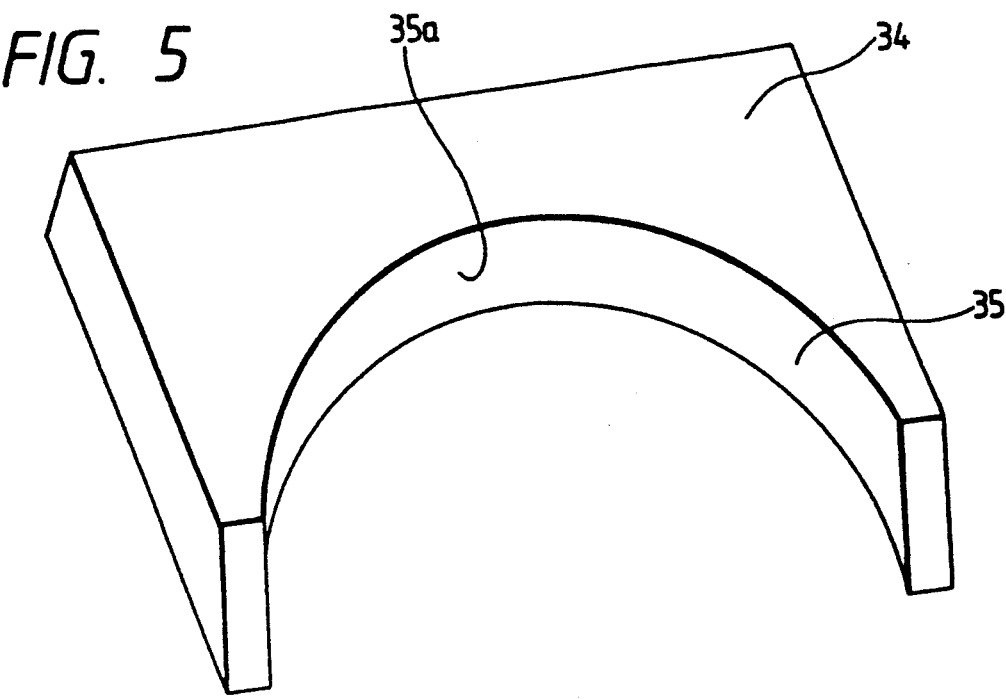
FIG. 5 is a perspective view showing a disk guide.

Also, as shown in FIGS. 3 and 4, the disk guide plate 34 for guiding the smaller diameter disk 106 of 8 cm to the clamp position when the disk 106 is transferred on the turntable 29 is provided on the inner surface of the clamp arm 32. Also, as shown in FIG. 5, a disk guide recess 35 is formed in the lower side and the central portion of the disk guide plate 34. This disk guide recess 35 is opened toward the disk insertion opening 2. An opening width of the disk guide recess 35 on the side of the disk insertion opening 2 is set so as to receive the small disk 106. Also, an arcuate circumferential wall 35a is provided in the guide recess 35. Also, as shown in FIG. 3, a centering lever 61 which is a substantially T-shaped member is provided on the upper surface of the clamper arm 32. Two elongated holes 61b, 61b extending in the sliding direction of the centering lever 61 are formed in the central portion of the central lever 61. The elongated holes 61b, 61b engage with pins 32d, 32d formed in the clamper arm 32, respectively. Two holes 61a, 61a are formed in the opposite sides of the centering lever 61.

Figure 6:
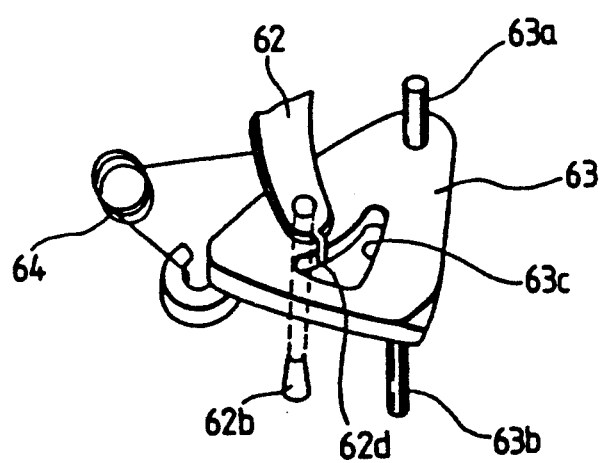
FIG. 6 is a perspective view showing a lock arm.
Figure 7:
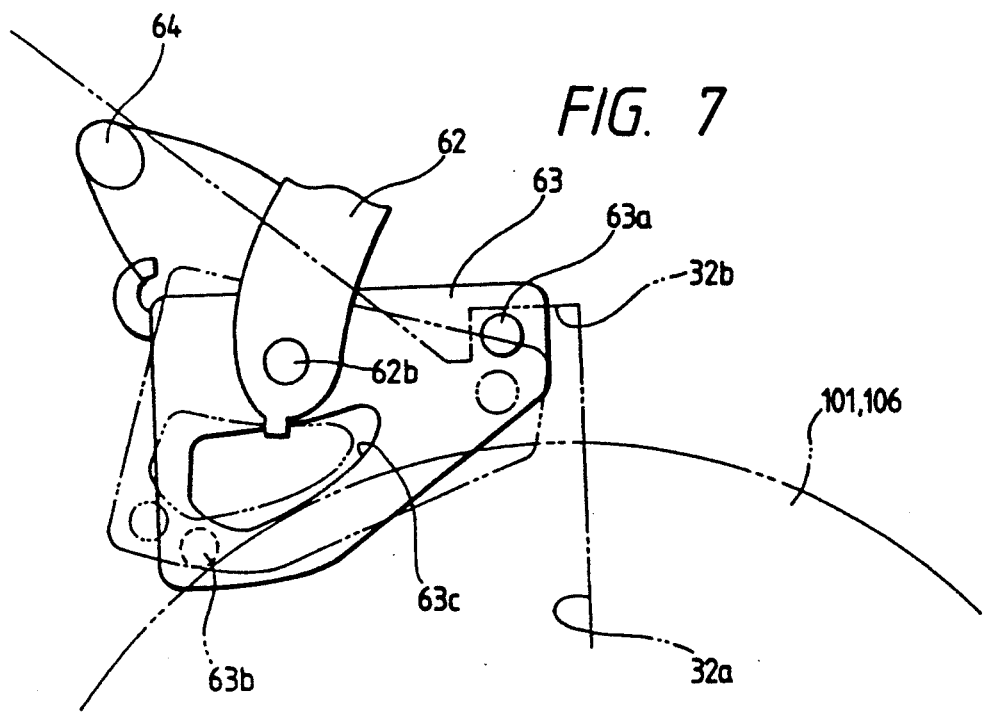
FIG. 7 is an enlarged view showing a lock release mechanism of the lock arm.

Subsequently, the structure of the centering mechanism which is symmetrical with respect to the center axis thereof in FIG. 3 will be explained as to the centering mechanism on the left side in FIG. 3. A centering arm 62 is provided in a lower surface of the clamper arm 32. A pin 62a of the centering arm 62 swingable about a pivot arm 62c is loosely engaged with the hole 61a. The pin 62a is formed at one end portion of the centering arm 62. Also, at the other end of the centering arm 62 (i.e., the front side end portion thereof), there is downwardly projected a centering pin 62b which is in contact with the circumferential portion of the disk and is used as a contact portion with the disk. In this case, a distance between the right and left centering pins 62b is set so that, when the small disk of 8 cm diameter is centered, the centering pins 62b do not come into contact with the circumferential portion of the disk of 8 cm. Furthermore, the lock arm 63 which is substantially in the shape of a triangle is rotatably provided on the centering arm 62 about the centering pin 62b (FIG. 6). The lock arm 63 has an opening 63c in the central portion thereof as best shown in FIG. 6. An engagement piece 62d mounted on the tip end of the centering arm 62 is engaged with the opening portion 63c. This structure is used as a stop mechanism against the rotation of the lock arm 63. Furthermore, the centering pin 62b passes through a one-corner portion. Also, the lock arm 63 has a lock pin 63a, for locking the swing motion of the centering arm 62, projecting upwardly at another corner portion of the lock arm 63 and a lock release pin 63b projecting downwardly of the other corner portion for releasing the lock condition. The lock arm 63 is always spring-biased inwardly by a lock arm biasing spring 64 interposed between the centering arm 62 and the lock arm 63. Namely, the lock arm 63 is biased in the direction in which the lock pin 63a is engaged with a lock recess portion 32b of an opening portion 32a opened in the clamper arm 32 shown in FIG. 7. With such a structure, the lock arm 63 is normally kept under the condition that the lock pin 63a is engaged with lock recess portion 32b. As described above, the like structures are provided in the right and left sides of the player to form the centering mechanism substantially in a symmetrical manner.

Also, an escape arm 66 is provided swingably about a swing center 66a in the clamper arm 32. One end portion of the escape arm 66 is engaged with a projection 61P of the right side portion of the centering lever 61. The escape arm 66 is always biased clockwise in FIG. 3 by an escape spring 67 interposed between the escape arm 66 and the clamper arm 32. With such an arrangement, the centering lever 61 is biased rearwardly, so that the pair of right and left centering arms 62 are biased inwardly. The other end portion (i.e., outward end) of the escape arm 66 is projected outside of the clamper arm 32 and is engaged with a converting arm 68.

Figure 8:
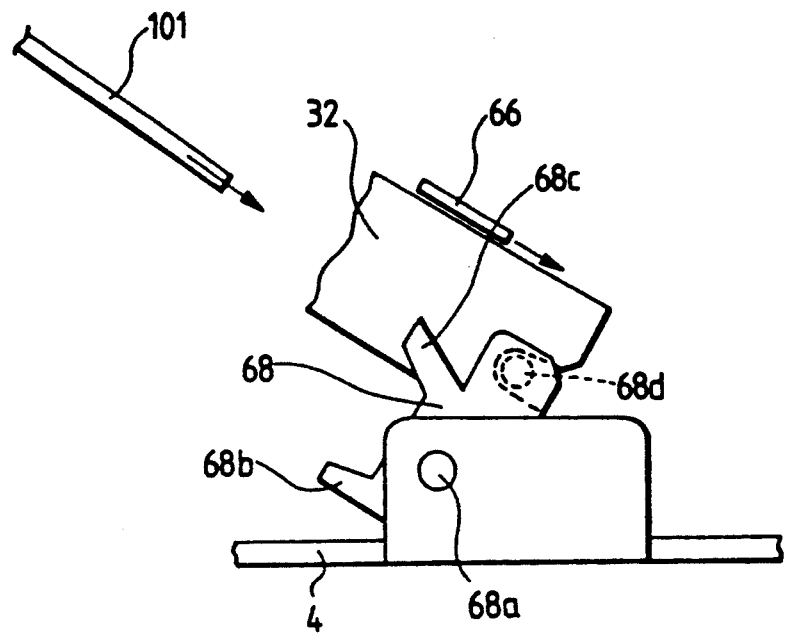
FIG. 8 is a side view showing an operation of the escape arm and a translation arm.
Figure 9:
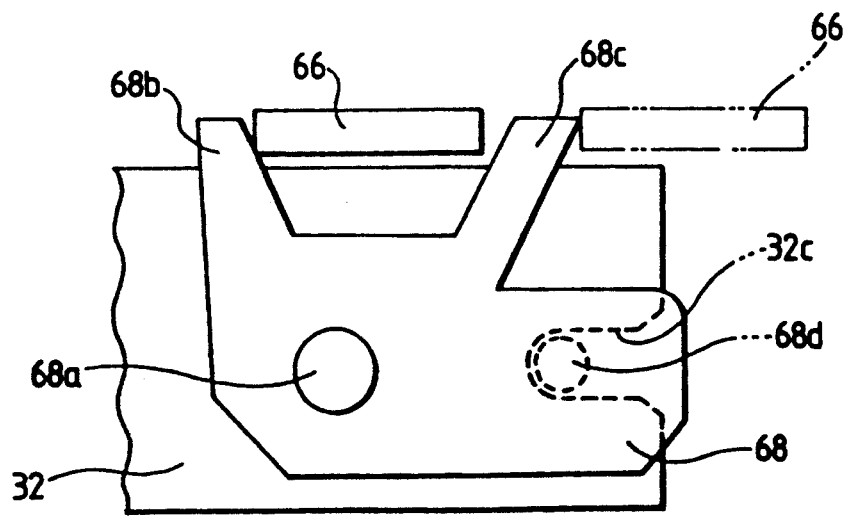
FIG. 9 is a side view showing the operation of the escape arm and the translation arm.

FIGS. 8 and 9 are enlarged side views showing a structure of the converting arm 68. The converting arm 68 is so constructed that it is retained at a position different from that of the outer portion of the escape arm 66. The converting arm 68 is swingably provided to the support frame 4 through a pivot pin 68a. Also, an upper portion of the converting arm 68 has a first projection 68b and a second projection 68c. Furthermore, an engagement pin 68d is provided on a surface of the converting arm 68 opposite to the swing pin 68a and is engaged with a guide groove 32c provided in a suitable position of the clamper arm 32 to thereby limit the swing range of the clamper arm 32.

Also, in the left part of FIG. 3, a disk detecting arm 69 for the disk 106 of 8 cm is provided coaxially with the pivot arm 62c of the centering arm 62 in the lower portion of the clamper arm 32. A disk detecting portion 69a is provided at a suitable position of the disk detecting arm 69 for the disk of 8 cm. The disk detecting portion 69a is biased by a disk detecting arm spring 70 so that it is always projected from the circumferential wall 35a of the guide recess 35 to the disk receiving portion.

Figure 10:
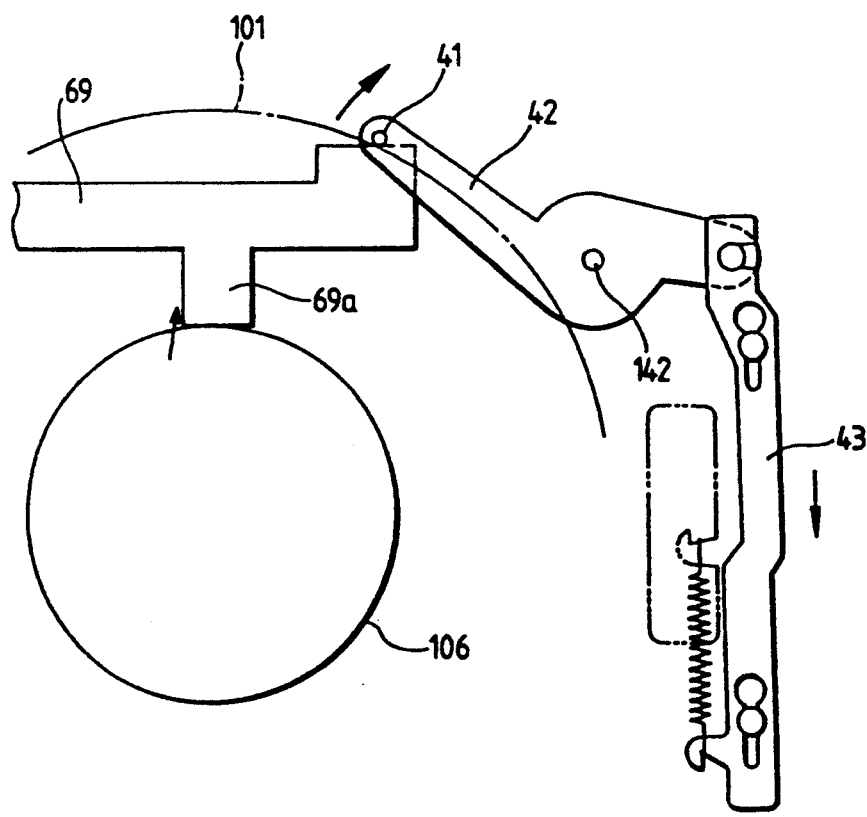
FIG. 10 is a top plan view showing the operation of a detecting pin.

As shown in FIG. 10, a detection pin 41 is mounted on one end of a first link 42 which forms a part of a linkage mechanism pivotally formed on a rear side of the frame 3. The other end of the first link 42 pivotally mounted around a pin 142 is coupled to a second link 43 mounted slidingly in the disk insertion direction. When the detecting pin 41 is depressed by the disk detecting arm 69 for the small diameter disk 106 and is depressed directly by the disk for the large diameter disk 101, the second link 43 is slidingly moved to thereby operate the loading arm swing mechanism 7 to lower the loading arm 8 with a pin 150 engaging with a projecting arm 32c (FIG. 2) whereby the clamper 32 is lowered.

On the other hand, as shown in FIGS. 1 and 2, a lock pin 44 is implanted in the side end of the support frame 4 and extends toward the frame 3. The lock mechanism 45 is provided in the frame 3 from which the lock pin 44 projects. The lock pin 44 is locked by the lock mechanism 45 until the inserted disk is transferred to the predetermined position. The support frame 4 is fixedly supported by the frame 3 when the lock pin 44 is locked. When the loading arm 8 is moved downwardly by the operation of the loading arm swing mechanism 7, the lock mechanism 45 is used to release the lock condition of the lock pin 44, and the support frame 4 is floatingly supported by the frame 3 through the dampers 5 when the lock pin 44 is released.

A movable cover 46 is openable/closable and is mounted on the frame 3 in the vicinity of the disk insertion opening 2. During the use of the CD player, the movable cover 46 is moved to the disk insertion opening 2 to thereby prevent another disk from being erroneously inserted into the disk insertion opening 2.

The operation of the above-described embodiment will now be described.

When the small diameter disk 106 is inserted into the disk insertion opening 2, the sensor 47 provided at the front portion of the ceiling plate 3a detects the insertion thereof to thereby drive the loading motor 10. The drive roller 9 is rotated by the loading motor 10. The small disk 106 is clamped between the guide member 51 and the drive roller 9 while being roughly centered, and the disk 106 is transferred toward the turntable 29 by the roller 9.

When the small diameter disk 106 is inserted while being somewhat displaced to the left as shown in FIG. 3, the circumference of the disk 106 is brought into contact with the lock release pin 63b provided in the left centering arm 62. As a result, the lock arm 63 is rotated in the direction in which the locking state is released (in the clockwise direction in FIG. 7). However, under this condition, the circumference of the disk 106 causes one of the lock arms 63 to rotate but the other lock arm 63 is kept under the locking state so that the locking state of the centering arms 62 is not released. Thus, the disk 106 is entered positively into the disk guide recess 35 of the disk guide plate 34 provided on the lower surface of the clamper arm 32 while being displaced to the right in contact with the centering pin 62b and being directed upward by the guide member 51 and the guide roller 9 as shown in FIG. 11. As a result, the centering operation is performed.

When the disk 106 is inserted into the disk guide recess 35, it is brought into contact with the arcuate circumferential wall 35a and guided to the center of the disk guide recess 35 along the circumferential wall 35a. When the disk 106 is guided to the center of the disk guide recess 35, as shown in FIG. 10, the disk detecting portion 69a of the disk detecting arm 69 for the disk of 8 cm, projected from the circumferential wall 35a is pushed. When the disk 101 is inserted in the middle of the disk insertion opening 2, the disk 101 causes the opposite lock arms 63 to be released substantially simultaneously and to be opened toward the outside to allow the insertion of the large diameter disk 101.

The thus inserted large diameter disk 101 is brought into direct contact with the detecting pin 41 as shown in FIG. 10 because the large diameter disk 101 is moved horizontally without contacting the disk guide recess 35.

Also, when the large diameter disk 101 is inserted, the opposite centering arms 62 are swung, the centering lever 61 is slidingly moved on the clamper arm 32. As a result, an escape arm 66 is swung in the counterclockwise direction in FIG. 4 against an escape arm spring 67 about a pivot center 66a. Under this condition, the clamper arm 32 is swung relative to the support frame 4 to thereby clamp the large diameter disk 101. In this case, an end portion of the escape arm 66 is biased to be depressed against the second projection 68c by the escape arm spring 67 as indicated by the two-dotted and dash line in FIG. 9. With such a structure, the centering arms 62 which are normally urged inwardly by the escape arm spring 67 may be fixedly supported in place. Thus, during the playback of the large diameter disk 101, the centering pins 62b are prevented from coming into contact with the disk 101. Also, in the case of the small disk 106, the escape arm 66 is urged to be depressed against the first projection 68b of the converting arm 68 by the escape arm spring 67. With such an arrangement, it is possible to prevent the centering pins 62b from coming into contact with the small disk 106.

Also, when the detecting pin 41 is depressed, as shown in FIG. 10, the first link 42 is pivoted about the pin 142 to thereby swing the second link 43 so that the pin 150 fixed to the loading arm 8 is released to thereby actuate the loading arm swing mechanism 7. Accordingly, as shown in FIG. 2, the side projecting piece 32c of the clamper arm 32 which is in contact with the loading arm 8 is lowered together with the loading arm 8 so that the clamper arm 32 is lowered by the spring force. As a result, the disk 101 or 106 loaded on the turntable 29 is depressed and fixed by the clamper 31. The disk 101 or 106 is fixed by the clamper 31, and the lock mechanism 45 releases the locking condition of the lock pin 44 in cooperation with the operation of the loading arm swing mechanism 7. Thus, the support frame 4 is floatingly supported through the dampers 5 to the frame 3. Thus, the playback preparatory operation is completed. Then, the spindle motor 30 is driven to rotate the disk 101 or 106 together with the turntable 29. When the disk 101 or 106 is rotated, a laser beam is irradiated from the readout head (not shown). The readout head is moved in the radial direction of the disk 101 or 106 to thereby reproduce the music recorded in the disk 101 or 106.

As described above, according to the present invention, even if the small diameter disk is inserted into the disk insertion opening while being displaced from the center thereof, it is possible to accurately position the disk on the clamp position of the turntable. Also, the centering arms of the centering mechanism are provided on the lower surface of the clamper arm, whereby the centering operation for the disk is performed in the vicinity of the clamp position of the disk to thereby more exactly center the disk. Furthermore, the centering mechanism is not provided in the vicinity of the disk insertion opening but in the clamper arm. Therefore, it is unnecessary to insert the disk while widely opening the centering mechanism. This leads to a good operational feeling in the disk insertion step.

Accordingly, even if the small or large diameter disk is delivered, it is possible to more exactly perform the centering operation and to position the disk exactly in the clamp position on the turntable.

What is claimed is:

1. A disk playback apparatus comprising:
a support frame;
a clamper arm swingably mounted on a rear portion of said support frame; and
a centering mechanism for guiding a large diameter disk and a small diameter disk from a front side of said playback apparatus to a playing position between said support frame and said clamper arm when the disk is inserted into the playback apparatus;
said centering mechanism comprising:
a pair of centering arms rotatably mounted on said clamper arm on a side of said clamper arm facing said support frame, said centering arms having centering pins extending therefrom for contacting a circumferential edge of said disks in said playing position;
a centering lever slidably attached to said clamper arm and operatively connected to said centering arms so as to cause said pair of centering arms to open and close in concert with each other; and
a lock arm rotatably mounted about each of said centering pins for locking said centering arms, said lock arms each having an opening into which an engagement piece mounted at tip end portion of said centering arm extends to form a stop mechanism against the rotation of said lock arm, said lock arm further including a lock pin projected upwardly and releasably engaging with a lock recess portion of said clamper arm for locking the swing motion of said centering arm, a lock release pin for rotating the lock arm to release the lock condition, and a lock arm-biasing spring interposed between said centering arm and said lock arm for biasing said lock pin in a direction in which said lock pin is engaged with said lock recess portion said lock arms allowing said pair of centering arms to be swingable only when both of said lock arms are released.

2. The apparatus according to claim 1, wherein said centering lever is made of a planer member and is provided above an upper surface of said clamper arm to be slidingly movable back and forth, said centering lever being connected to said pair of centering arms in a symmetrical relation.

3. The apparatus according to claim 1, wherein said pair of centering arms are symmetrically provided, each centering arm including a centering pin implanted in a forward end portion of the associated centering arm, said centering pins being brought into contact with the circumferential edge of the disk and extending toward said support frame, wherein a distance between two centering pins are set so that, when the small diameter disk is clamped by said clamper arm, said centering pins are out of contact with said small diameter disk.

4. The apparatus according to claim 1, further comprising a guide means provided near a disk insertion opening for guiding the large disk horizontally and the small disk upward to the clamper arm.

5. The apparatus according to claim 1, wherein said centering mechanism further includes a disk guide plate for guiding the disk to the clamp position, said guide plate being mounted on a lower surface of said clamper arm, said guide plate having a disk guide recess having an opening facing a direction of disk insertion.

6. The apparatus according to claim 1, wherein said centering mechanism further includes an escape arm provided swingably on said clamper arm and engaged with said centering lever, wherein said escape arm holds said pair of centering arms in the open direction through said centering lever when the disk is rotated and maintains a non-contact condition between the disk and a contact portion of each of said centering arm.

7. The apparatus according to claim 6, wherein said escape arm is urged to push rearwardly said centering lever and to bias the pair of centering arms inwardly by an escape arm spring interposed between said clamper arm and said escape arm, and an outward end portion of said escape arm is engaged with a converting arm swingably mounted on said support frame for being retained at different positions.

8. The apparatus according to claim 7, wherein a first projection and a second projection for retaining said outward end portion of said escape arm are provided in an upper portion of said converting arm, and an engagement pin is provided for limiting a swing motion range of said clamper arm by engaging with a guide groove of said clamper arm.

* * * * *